United States Patent [19]
Jost et al.

[11] Patent Number: 5,354,526
[45] Date of Patent: Oct. 11, 1994

[54] PROCESS FOR MANUFACTURING REINFORCED DUROPLASTIC PIPES IN A CENTRIFUGAL PROCESS AND INSTALLATION FOR CARRYING OUT THE PROCESS

[75] Inventors: Ralf Jost, Füllinsdorf, Switzerland; Reinhart Ratheiser, Guttaring, Austria

[73] Assignee: Hobas Engineering AG, Birsigstrasse, Switzerland

[21] Appl. No.: 75,540

[22] PCT Filed: Oct. 20, 1992

[86] PCT No.: PCT/CH92/00212

§ 371 Date: Jun. 10, 1993

§ 102(e) Date: Jun. 10, 1993

[87] PCT Pub. No.: WO93/08009

PCT Pub. Date: Apr. 29, 1993

[30] Foreign Application Priority Data

Oct. 23, 1991 [CH] Switzerland ............ 3096/91

[51] Int. Cl.$^5$ .............................. B29C 41/04
[52] U.S. Cl. .................. 264/40.4; 264/311; 425/147; 425/148; 425/434; 425/435; 425/449
[58] Field of Search ......... 264/40.4, 311; 425/147, 425/148, 434, 435, 449

[56] References Cited

U.S. PATENT DOCUMENTS

| | | | |
|---|---|---|---|
| 2,568,332 | 9/1951 | Genovese | 425/147 |
| 3,280,232 | 10/1966 | Lander et al. | 425/435 |
| 3,561,059 | 2/1972 | Guldenfels | 425/434 |
| 4,278,411 | 7/1981 | Anderson | 425/435 |
| 4,358,264 | 11/1982 | Yamamoto et al. | 264/311 |

FOREIGN PATENT DOCUMENTS

| | | |
|---|---|---|
| 0360758 | 3/1990 | European Pat. Off. |
| 1779980 | 2/1973 | Fed. Rep. of Germany |
| 2921652 | 12/1980 | Fed. Rep. of Germany |
| 311092 | 12/1981 | Fed. Rep. of Germany |
| 2241407 | 3/1975 | France |
| 50-39108 | 12/1975 | Japan ............ 425/435 |
| 404182 | 6/1966 | Switzerland |
| WO86/5436 | 9/1986 | World Int. Prop. O. .......... 264/311 |

Primary Examiner—Jay H. Woo
Assistant Examiner—Robert B. Davis
Attorney, Agent, or Firm—McGlew and Tuttle

[57] ABSTRACT

To eliminate the fluctuations in the precision of the material distribution which could not be avoided when manufacturing pipes in the centrifugal moulding process with the prior art installations, a new process and an installation for carrying out the process is proposed. This has at least two cylindrical centrifugal drums (1) serving as moulds and an injection carriage (12) which is displaceable in two directions perpendicular to each other, with a feed arm (11). The improvement is that the carriage stands on a frame (9) which is displaceable on the floor of the building (8) in the direction transverse to the axis of the mould (10), and is displaceable on the frame transverse to the direction of travel thereof, in that the carriage has a working bin (13) for the sand with a relatively small volume, which is connected via a first flexible line (19) with a bulk bin (20), from which it is continuously refilled, so to speak, by way of compressed air transport, the two bins being fitted with weight measurement cells. These measurement cells are connected with a calculating and control apparatus (30) which controls the supply of sand, resin and glass fibers according to an individual program for each pipe construction.

16 Claims, 3 Drawing Sheets

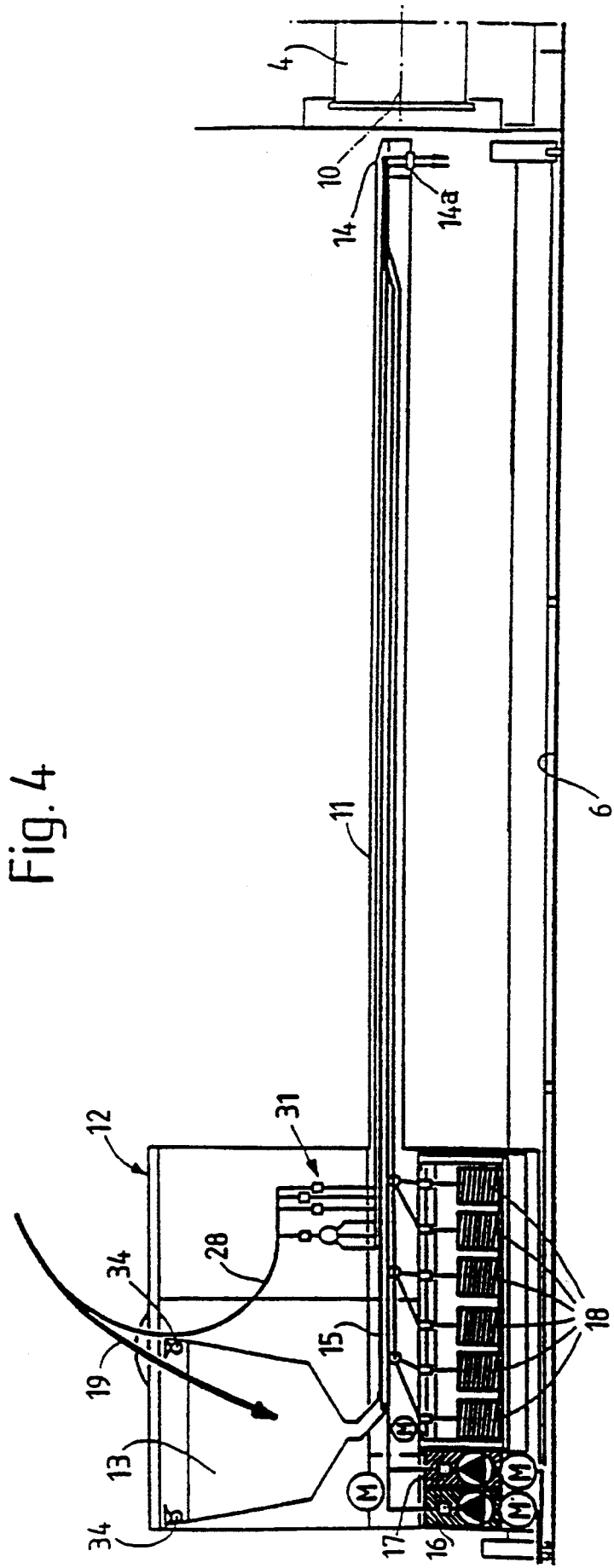

PROCESS FOR MANUFACTURING REINFORCED DUROPLASTIC PIPES IN A CENTRIFUGAL PROCESS AND INSTALLATION FOR CARRYING OUT THE PROCESS

FIELD OF THE INVENTION

The present invention relates to a process and apparatus for manufacturing pipes where material is entered into a mold by a feed arm, and more particularly to such a process and apparatus where the amount of material moved with the feed arm is kept substantially constant for each mold to eliminate variations between molds, and the amount of material is kept below a point where separation of the material would occur.

BACKGROUND OF THE INVENTION

There exists a prior art installation for manufacturing reinforced duroplastic pipes, that is, pipes made of a resin, to which may be added a filler, the appropriate catalyst, as well as glass fibre inserts and a sand in a centrifugal process. This prior art installation has an injection carriage provided with a feed arm and is suspended, in the manner of a stock crane, on a vertically displaceable frame, i.e. on two tracks disposed one on each column, and contains all the starting materials, except the liquid resin, for feeding the rotating, cylindrical mould, namely 1½ to 3 m³ sand, the glass fibres and the liquid catalyst. To refill the sand, the carriage must be brought to a special loading point and filled there, which always causes a considerable interruption in the operation. To supply the electrical energy required to drive the travel mechanism, the liquid pumps, the feed device for the sand, the cutting device for the glass fibres, and to feed the latter into the interior of the mould, towed cables are used for each of the two displacement devices which are expensive to install and maintain, but which cannot be replaced by anything less expensive, are used for each of the two displacement devices.

When a pipe is manufactured, the individual components which go to make up the pipe, that is, the liquid resin, which may contain a fine filler, the corresponding catalyst, the glass fibers and the sand, are introduced from an outlet at the free end of the feed arm into a rotating, drum-shaped mould at an appropriate mould speed, injection carriage advancement rate and quantity of individual components conveyed are selected according to the required composition. During careful quality checking of the pipes manufactured with these prior art installations, small fluctuations in the uniformity of the composition of the wall were noted, consisting essentially of an irregularity in the distribution of the sand, both as regards the thickness and the graining. Although these fluctuations lie below a tolerance level and are therefore harmless, they ought to be avoided to improve quality. However, since they could not be systematically reproduced, it was not possible to establish the cause and to eliminate them. Detailed studies and intermediate measurements revealed that the fluctuations in the regularity of the sand granulation, that is the accumulation of course grained sand at certain points and of fine grained sand at other points are probably caused by the sand separating out in the sand container due to the vibration of the container, and that the cause of the irregularities in the distribution of the sand might be due to the fact that the height of the feed arm outlet of the injection carriage is not constant.

SUMMARY AND OBJECTS OF THE INVENTION

These disadvantages are now to be overcome with this invention. This is made possible on the one hand by a new process which is characterized in that the sand is fed continuously from a fixed bin to an intermediate container disposed in the injection carriage and is then introduced from there into the mould according to the production program preset to the required pipe composition.

Although the basic ideas from the prior art installation were adopted in the installation according to this invention, they are implemented in a significantly more advantageous manner, so that in addition to the intended improvement in quality, it was also possible to achieve a reduction in the set-up and maintenance costs of the installation and also, due to the much shorter down-times, a considerably higher production rate.

The new installation is characterized in that a) the injection carriage stands on a frame which is displaceable on a floor of the building in the direction transverse to the axis of the mould, and is displaceable on the frame transverse to its direction of travel, b) the carriage contains a working bin for the sand with a volume of 150 to 500 litres, c) disposed above the floor of the building there is a bulk bin connected with the working bin via a first flexible line, from which the sand is conveyed into the working bin with compressed air, d) there is a conveying device for filling the bulk bin, e) both the working bin and the bulk bin are fitted with weight measurement cells and in that f) there is a calculating and control apparatus, which
   switches on the conveying device for filling the bulk bin when a preset minimum weight or volume is reached, and switches it off when a preset maximum weight or volume is reached, but blocks it for the time during which sand is introduced into the mould,
   controls the rate at which the injection carriage advances according to a preset program, preferably in such a way that the maximum occurring accelerations remain below the value which might cause a separating out of the sand in the working bin
   continuously measures and adds the weights of the bulk bin and the working bin,
   measures the reduction of this total weight whenever sand is introduced into the mould and
   controls the sand conveying and dosing installation whenever sand is delivered, so that the specific quantity delivered, that is, the quantity delivered per unit of time, and the duration of the individual feed operation runs according to the preset program.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4 is a side elevation of the injection carriage on a larger scale.

DETAILED DESCRIPTION OF THE PREFERRED EMBODIMENT

Figure 1:
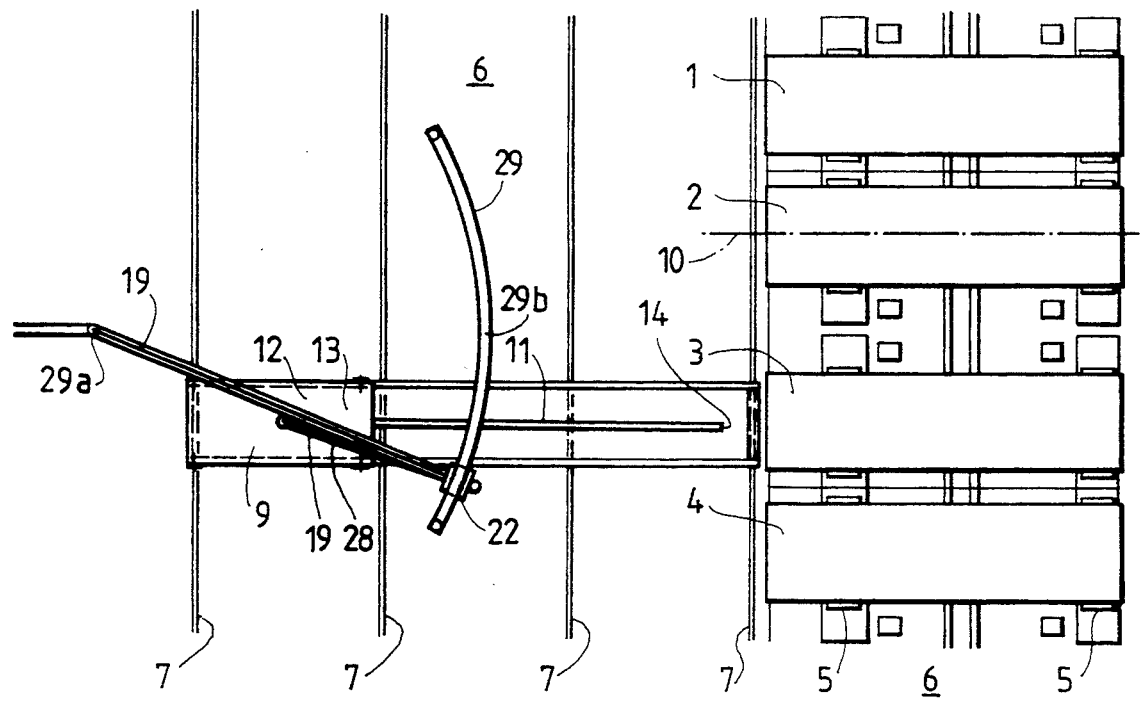
FIG. 1 shows a purely diagrammatic top-plan view of an installation according to the invention with four moulds and one injection carriage.
Figure 2:
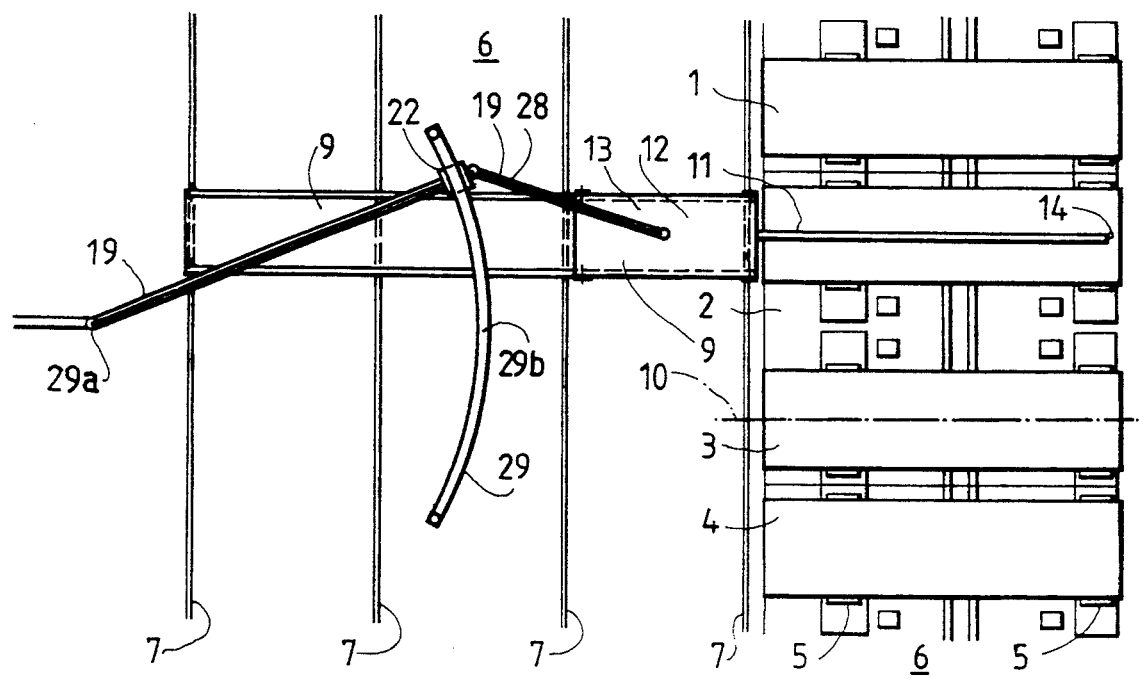
FIG. 2 shows the same view, with the injection carriage in a different position.
Figure 3:
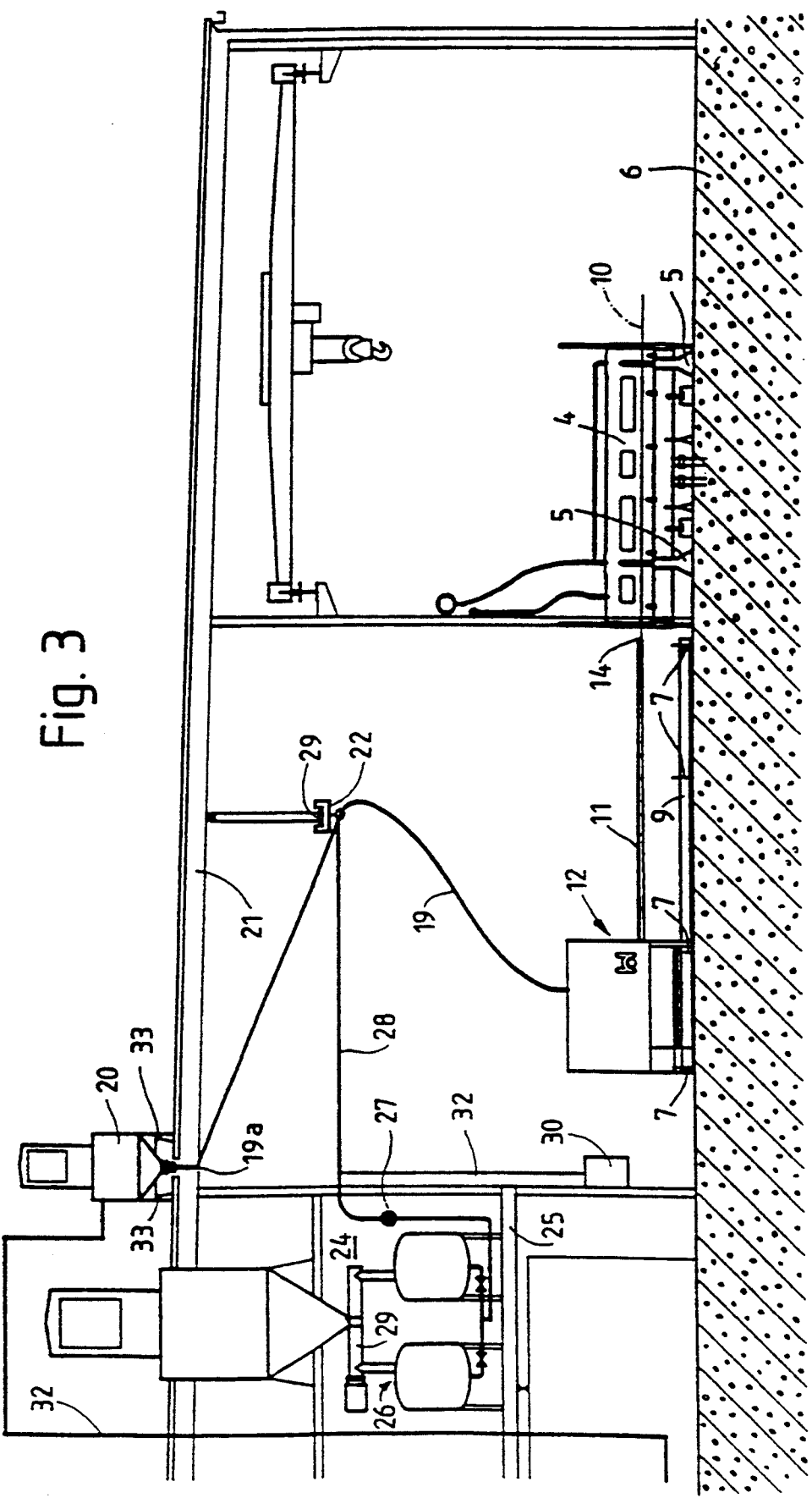
FIG. 3 is a side elevation of the installation.

The installation illustrated in FIGS. 1 to 3 has four centrifugal drums 1, 2, 3, and A for manufacturing plastic pipes. Even though in the drawings, these drums all have the same diameter it is certainly possible to dispose centrifugal drums with varying diameters adjacent to one another. These centrifugal drums are rotatably mounted on purely diagrammatically illustrated bearings 5. Motors, (not shown), serve to rotate these drums at the required number of revolutions. As can be seen in FIG. 3, the bearings 5 stand on the floor 6 of the production hall. On this same floor 6, or contrived therein, two or more tracks 7 are also disposed for the wheels, (not shown in the drawing), of the chassis 9. The chassis 9, which is provided with motor-driven wheels, is thereby displaceable in a mold direction transverse to the direction of the drum axis 10. Standing on this chassis 9 is the injection carriage, which is provided with a feed arm 11, and is designated as a whole by 12. Also by means of motor-driven wheels, the latter is displaceable on the chassis 9 in its longitudinal or injection direction, that is, in the direction of the drum axis 10. As can be seen in FIG. 4, the injection carriage 12 contains a small, i.e. comprising 150 to 500 litres, working bin 13 serving as an intermediate container for the sand, as well as a feed screw 15, (represented in the drawing by two straight lines only), provided with a variable revolution motor. The feed screw is designed as a dosing device and extends up to the free end 14 of the feed arm 11, for conveying the sand from the working bin 13 to the outlet 14a of arm 11. Furthermore, the carriage contains two catalyst bins 16 and 17, each provided with a dosing pump, as well as reels of glass fibre 18. In the free end 14 of the feed arm there is a device provided with rotating cutting knives to draw the glass fibre thread more or less quickly, as needed, to the free end and to cut it there into pieces of the required length. Because the chassis 9 stands on the floor, where it is displaceable on two or three or even four tracks, it is preventing from bending downwards in the middle. Because the injection carriage is significantly lighter, due to the smaller sand bin, than in the previous prior art installation, the risk of bending is much less than in the prior art installations, even if only two tracks 7 are used. If the chassis 9 were to bend, it would not only cause the height of the free end 14 of the feed arm 11 with the outlet 14a to change when the injection carriage 12 is displaced on its chassis 9, it would also mean that this change would depend on the momentary content level, i.e. the weight of the injection carriage. Once it had been realized that certain irregularities were caused by these unperiodical changes, these irregularities were able to be completely eliminated by the new arrangement.

A further step, namely an essential one, in avoiding sporadically occurring deviations in precision was achieved due to the fact that in the installation of the invention, the injection carriage 12 contains only one intermediate container for the sand, namely the relatively small working bin 13, that is, a bin with a volume of 150 to 500 litres. The working bin can be so small due to the fact that the working bin 13 is connected via a flexible line or delivery means 19 with a bulk or stationary bin 20 fixed on a higher level; in this case on the ceiling 21, from which the sand is conveyed continuously into the working bin 13 by means of compressed air. The transport air can flow back to the bulk bin via a flexible line disposed parallel to flexible line 19. Because the sand now remains for only a short time in the working bin serving as the intermediate container it does not separate out, and this was determined by an examination of the finished product.

The bulk bin 20 is itself provided with a conveying device which is merely diagrammatically represented in FIG. 3 and line 32 and which may be any sand conveying device known per for example, a conveyor belt or a conveying device driven by compressed air or a differently designed device. Both the bulk bin 20 and the working bin 13 are fitted with weight measurement cells, the first being designated by 33 and the others by 34. A calculating and control apparatus or means 30 switches on the aforementioned conveying device 32 for filling the bulk bin 20 when an adjustable minimum weight or volume is reached, and switches it off when an adjustable maximum weight or volume is reached. The apparatus 30 blocks the conveying device 32 for the time during which sand is introduced into one of the rotating moulds by means of the feed screw 15. This calculating and control apparatus also serves to control the rate of advancement of the injection carriage 12 according to a preset program, this program being of course designed for manufacturing a pipe with a quite definite or predetermined layer composition. Furthermore, the calculating and control apparatus 30 serves to measure continuously the weights of the bulk bin and the working bin and add the two weights and measure the reduction of this total weight whenever sand is introduced into the mould. The calculating and control apparatus 30 then controls, according to a preset program, the conveying and dosing installation, that is in this case the feed screw 15 whenever sand is to be delivered. The specific quantity delivered, that is, the quantity delivered per unit of time, and also the duration of the individual sand feed operation run according to the preset program.

The following advantages result from the process of the invention and the arrangement of the invention:

1. The sand is prevented from separating out by being conveyed and stored in such a way that there is no longer any possibility of a separation, thus guaranteeing a perfectly homogeneous distribution of sand in the finished product.

2. Since the injection carriage can only contain maximum 500 liters sand it is significantly lighter than an injection carriage containing 1½ or even up to 3 m³ of sand. Thus, much less energy is required to advance the carriage and to brake it.

3. Since, due to the constant supply of sand, the weight of the injection carriage varies only insignificantly, the change in speed at the beginning and the end of each displacement movement can be controlled so that it may be exactly reproduced, which gives greater accuracy and uniformity in the distribution of all components and thus in the pipe manufacturing process.

4. The down-times previously required to fill up the bin housed in the injection carriage no longer occur since it can be refilled at any time from the bulk bin 20, regardless of whatever operating condition the injection carriage 12 is in.

All these advantages, by means of which a qualitatively significantly improved product can be manufactured in comparison with the manufacturing processes of the old installations, are certainly, with hindsight, clear and obvious although it was almost impossible to determine the cause for the sporadically occurring irregularities in the pipes manufactured with the prior art processes and installations.

As can be seen in FIG. 3, the flexible line 19 is affixed to a support 22 which, in this case, is a runner mechanism suspended on a horizontal runner rail 29 suspended from the ceiling 21 at a distance thereto. As can be seen in FIGS. 1 and 2, the runner rail 29 is circularly curved in such a way that its center 29a lies below the point 19a at which the flexible line 19 leaves the bulk bin 20. Furthermore, it is disposed so that the middle of the rail 29b lies in the area above the center between two extreme positions of the injection carriage 12. Naturally, the definitive design of the support 22 could be slightly different. As can be seen in FIGS. 1 and 2, the support 22 can easily be displaced in this manner to allow continuous feeding of the working bin 13 in injection carriage 12, regardless whether the injection carriage is in an extreme position, as shown in FIG. 1, or in a more central position, as shown in FIG. 2.

In FIG. 3 of the drawings it can furthermore be seen that a tank or a tank installation 26 for the liquid resin is housed in a space 24, with a flexible floor 25 located above the floor 6 of the building. This installation may, as can be seen in FIG. 3, additionally contain a mixing station 29, by means of which fine additives such as calcium carbonate can be added to the liquid resin. An electrically driven conveying and dosing pump 27 connected to the calculating and control apparatus 30 conveys the liquid resin through a second flexible line 28 to the injection carriage 12. This second flexible line is also affixed to the support 22 and from there accompanies the first flexible line 19 to the injection carriage 12, where additional control elements 31 control the flow to the outlet 14. Because the liquid resin supply bins are not housed in the injection carriage it is possible, by means of a simple valve operation, to modify the liquid resin or to use a different liquid resin, thereby avoiding further shutdown time.

Together with the two flexible lines 19 and 28 and the reflux line for the air serving to transport the sand, the control lines 32 from the calculating and control apparatus 30 as well as one or several electric cables for supplying all the drive motors housed in the injection carriage 12 can now be led to the injection carriage without any additional aid.

When the process described in the introduction for manufacturing a plastic pipe is complete, the drum sealing element consisting, for example, of a circular ring disk situated at the end of the centrifugal drum furthest from the injection carriage 12 is removed so that the finished pipe can be drawn out there from the centrifugal drum serving as the mould. Due to the fact that the finished pipe is removed from the mould on this side a very practical operating sequence can be achieved, an operating sequence in which the starting materials are supplied on one side of the mould whilst further processing of the finished pipes, such as sectioning for example, can take place on the other side.

We claim:

1. A process for producing a composite pipe, this process comprising the steps of:
   providing a pipe mold;
   providing a movable injection carriage with a working bin;
   providing a stationary bin;
   moving filler from said stationary bin to said working bin to maintain a level of filler in the working bin substantially constant;
   moving said injection carriage in an injection direction into and out of said mold;
   feeding said filler from said working bin into said mold when said injection carriage is in said mold.

2. A process in accordance with claim 1, wherein:
   the step of moving said injection carriage is controlled so that acceleration of said injection carriage is maintained below a level causing the filler to separate in said working bin.

3. A process for producing a plurality of composite pipes, this process comprising the steps of:
   providing a plurality of pipe molds;
   providing a movable injection carriage with a working bin;
   providing a stationary bin;
   moving said injection carriage in an injection direction into and out of said mold;
   moving said injection carriage in a mold direction to move said injection carriage from one of said plurality of molds to another;
   feeding filler from said working bin into each of said plurality of molds when said injection carriage is in said each mold;
   moving filler from said stationary bin to said working bin to maintain an amount of filler in said working bin below a volume that would cause separation of the filler in said working bin, said moving of said filler also maintaining said amount of filler in said working bin sufficiently constant during each of said feedings of filler into each of said molds to substantially identically distribute the filler in each of said molds.

4. An apparatus for producing a plurality of composite pipes, this apparatus comprising:
   a plurality of pipe molds;
   an injection carriage movable in a mold direction from one of said plurality of molds to another, said injection carriage including a working bin and a feed arm means movable in an injection direction into and out of each of said molds and for feeding filler from said working bin into said each of said molds;
   a stationary bin with respect to said injection carriage and spaced from said injection carriage;
   flexible filler delivery means for moving filler from said stationary bin to said working bin, independent of a position of said injection carriage in said mold direction;
   control means for controlling said filler delivery means to maintain an amount of filler in said working bin below a volume that would cause separation of the filler in said working bin, said control means also maintaining said amount of filler in said working bin sufficiently constant during each of said feedings of filler into each of said molds to substantially identically distribute the filler in each of said molds.

5. An apparatus in accordance with claim 4, wherein:

said stationary bin is positioned above said working bin;

said filler delivery means includes a flexible line and moves the filler from said stationary bin to said working bin through said flexible line with compressed gas.

6. An apparatus in accordance with claim 4, wherein:

said control means includes measurement means for individually measuring an amount of sand in said stationary bin and said working bin.

7. An apparatus in accordance with claim 6, further comprising:

a conveying means for filling said stationary bin with the filler under control from said control means.

8. An apparatus in accordance with claim 7, wherein:

said control means controls said conveying means to fill said stationary bin when said measurement means indicates a predetermined minimum amount of filler in said stationary bin, said control means controls said conveying means to stop filling said stationary bin when said measurement means indicates a predetermined maximum amount of filler in said stationary bin, said control means controls said conveying means to stop filling said stationary bin when said feed arm means is feeding filler into said molds.

9. An apparatus in accordance with claim 6, wherein:

said control means also controls said injection carriage movements in said injection and mold directions according to a predetermined program;

said measurement means continuously measures a weight of the filler in each of said stationary bin and said working bin;

said control means adds together the weight of the filler in said stationary bin and said working bin, said control means also calculating a decrease in said weight of said stationary bin and said working bin during feeding of the filler into said mold, said control means also controlling said feed arm means to feed a predetermined amount of filler into said each of said molds for a predetermined time period according to a predetermined feeding program.

10. An apparatus in accordance with claim 4, wherein:

said injection carriage moves in said injection and mold directions on a frame;

the filler is sand;

said working bin has a volume of between 150 and 500 liters.

11. An apparatus in accordance with claim 4, wherein:

said feed arm means includes a feed screw and a variable revolution motor.

12. An apparatus in accordance with claim 4, further comprising:

a stationary tank containing liquid resin and a dosing pump positioned above said injection carriage;

flexible resin delivery means positioned above said injection carriage and for moving the resin from said stationary tank to said injection carriage independent of a position of said injection carriage in said mold direction.

13. An apparatus in accordance with claim 12, wherein:

said flexible filler and resin delivery means include a horizontally displaceable support positioned between said working bin and said stationary bin, said support holding a flexible line of said filler delivery means, a flexible line of said resin delivery means and an energy line of said control means, all of said lines leading to said injection carriage.

14. An apparatus in accordance with claim 13, wherein:

said support includes a runner mechanism suspended on a curved rail.

15. An apparatus in accordance with claim 14, wherein:

a curve of said curved rail has a center point below said stationary bin and a middle of said curved rail is positioned above a substantially middle position of said injection carriage in said injection direction.

16. An apparatus in accordance with claim 4, wherein:

said each of said molds includes a removable seal means for removing a pipe made in said each mold, said removable seal means being positioned on a side of said each mold substantially opposite said injection carriage.

* * * * *